United States Patent
Elliott et al.

(10) Patent No.: US 7,324,506 B1
(45) Date of Patent: Jan. 29, 2008

(54) USING DSL SERVICES TO FACILITATE REAL-TIME COMMUNICATIONS IN ENTERPRISE NETWORKS

(76) Inventors: Stephen Bennett Elliott, 702 Buffalo Springs Dr., Allen, TX (US) 75013; Alan Frank Graves, 22 Appaloosa Drive, Kanata (CA) K2M 1N7; John Watkins, 19 Laurel Street, Ottawa (CA) K1R 6T8

( * ) Notice: Subject to any disclaimer, the term of this patent is extended or adjusted under 35 U.S.C. 154(b) by 982 days.

(21) Appl. No.: 10/705,274

(22) Filed: Nov. 10, 2003

(51) Int. Cl.
*H04L 12/66* (2006.01)
(52) U.S. Cl. .................. 370/354; 370/355; 379/198
(58) Field of Classification Search ............ 370/354
See application file for complete search history.

(56) References Cited

U.S. PATENT DOCUMENTS

| 6,711,207 B1 * | 3/2004 | Amrany et al. ........... 375/222 |
| 6,757,367 B1 * | 6/2004 | Nicol .................... 379/90.01 |
| 7,099,305 B1 * | 8/2006 | Fardid ................... 370/352 |
| 2004/0136394 A1 * | 7/2004 | Onna et al. ............ 370/438 |
| 2004/0139354 A1 * | 7/2004 | Jones et al. ........... 713/202 |
| 2004/0213189 A1 * | 10/2004 | Alspaugh et al. ..... 370/338 |
| 2005/0021835 A1 * | 1/2005 | Palm ..................... 709/237 |

* cited by examiner

*Primary Examiner*—Creighton Smith
(74) *Attorney, Agent, or Firm*—Withrow & Terranova, PLLC

(57) ABSTRACT

The present invention delivers both voice and real-time communications over telephony infrastructure. The telephony infrastructure will effectively couple a DSL server in a local telephony exchange to telephony terminals and DSL modems at any number of user locations. Each DSL modem will be coupled to a computing device, such as a personal computer, that is capable of facilitating real-time communications. The DSL server is directly or indirectly coupled to a packet network. In addition to being coupled to the DSL server, telephony cabling at the local telephony exchange is also coupled to a telephony switch to support circuit-switched voice communications. As such, circuit-switched voice sessions may be established via the telephony switch with the telephony terminal over the same telephony cabling. Real-time communications may be provided over the telephony cabling using DSL service between the DSL modem and the DSL server.

25 Claims, 7 Drawing Sheets

USING DSL SERVICES TO FACILITATE REAL-TIME COMMUNICATIONS IN ENTERPRISE NETWORKS

FIELD OF THE INVENTION

The present invention relates to communications, and in particular to using digital subscriber line (DSL) services to facilitate the convergence of voice and real-time communications.

BACKGROUND OF THE INVENTION

There is a trend towards converging voice and data networks, wherein a single network can carry data and voice, as well as other real-time communications. These real-time communications may include video, data, and packetized voice. Given the existing infrastructure, including cabling, switches, and routers, there is a movement toward providing real-time communications, and in particular voice, on traditional data networks.

Real-time communications differ from traditional data communications in that special efforts must be made to ensure that the packets carrying the audio, video, or voice information are received in a timely fashion. Since real-time communications must compete with traditional data communications on data networks, the data networks that carry real-time communications and data must include the capability of prioritizing the real-time communications with respect to other data, and in many cases, one real-time media stream with respect to another. In addition to priority, quality of service controls must be provided to ensure consumers are receiving an appropriate level of service. Such prioritization and quality of service control is generally referred to as differentiated services.

To take advantage of the extensive infrastructure in place for data communications, a significant amount of re-engineering, which will result in extensive hardware and software upgrades, will be necessary to support real-time communications on the traditional data networks, especially among local area networks (LANs) included in and maintained by enterprise entities, such as businesses, hospitals, and government organizations. Further, to avoid moving away from the extensive telephony infrastructure used for traditional voice communications, there is a need to take advantage of the existing telephony infrastructure to minimize the cost associated with convergence and expedite the transition associated therewith. Accordingly, there is a need for a technique to support voice and real-time communications, while minimizing the cost of implementation.

SUMMARY OF THE INVENTION

The present invention delivers both voice and real-time communications over telephony infrastructure. Telephony cabling in the telephony infrastructure will effectively couple a DSL server in a local telephony exchange to telephony terminals and DSL modems at any number of user locations. Each DSL modem will be coupled to a computing device, such as a personal computer, that is capable of facilitating real-time communications. The DSL server is directly or indirectly coupled to a packet network. In addition to being coupled to the DSL server, the telephony cabling at the local telephony exchange is also coupled to a telephony switch to support circuit-switched voice communications. As such, circuit-switched voice sessions may be established via the telephony switch with the telephony terminal over the same telephony cabling. Real-time communications may be provided over the telephony cabling using DSL service between the DSL modem and the DSL server. Differentiated services, such as quality of service control, may be provided with a differentiated services controller operatively associated with the DSL server. Further, a media controller may be provided to associate real-time communication based media session with voice sessions.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
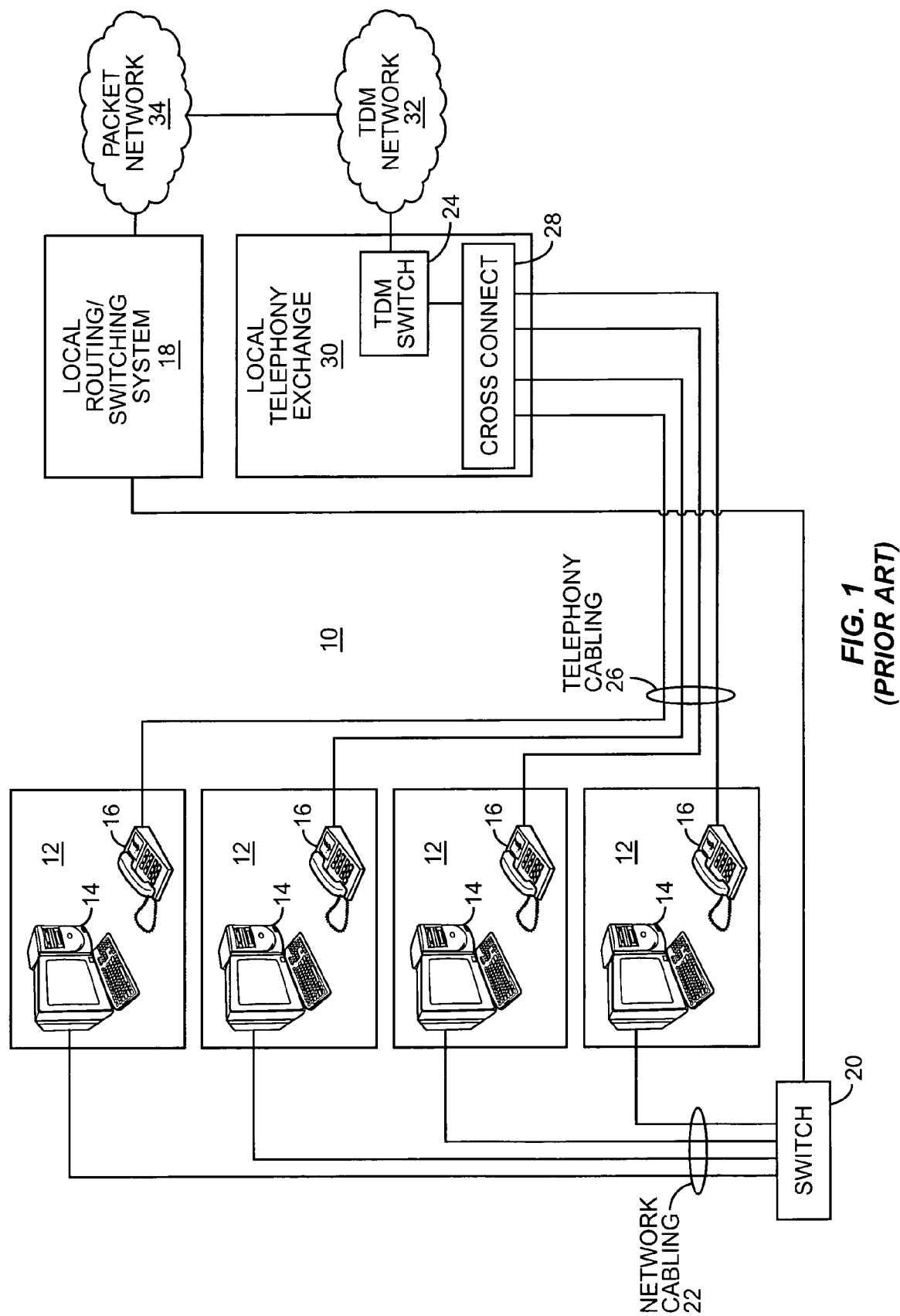
FIG. 1 is a block representation of a communication environment supporting data and voice communications according to the prior art.

With reference to FIG. 1, a typical enterprise communication environment 10 is illustrated as having multiple user locations 12, which provide a computer 14 and a telephone terminal 16 for the user. In this environment, data and voice services are provided by different networks. The data services are provided via a local routing/switching system 18, which will connect to a switch 20 connected to each of the computers 14 via network cabling 22. Notably, these computers 14 may also represent local area networks (LANs), which contain any number of computers and servers. Accordingly, data services, such as internet access, email, instant messaging, file transfer, and the like to systems outside of the local network are provided via the local routing/switching system 18, switch 20, and network cabling 22 outside of any voice services provided to the telephony terminal 16.

Voice services are provided via a time-division multiplex (TDM) switch 24 and telephony cabling 26 coupling to each of the telephony terminals 16, directly or via a cross connect 28, which cooperates with the TDM switch 24 to facilitate circuit-switched connections to the telephony terminals 16 via the telephony cabling 26. In many enterprise environments 10, the TDM switch 24 and the cross connect 28 are part of a local telephony exchange 30, such as a private branch exchange (PBX) or key system which will serve all or a portion of the enterprise's campus and connect to a public TDM network 32, such as the Public Switched Telephone Network (PSTN). The TDM network 32 will represent the core network for providing voice services outside of the enterprise infrastructure. Similarly, a packet network 34, such as the Internet, may provide packet services to the enterprise via the local routing/switching system 18. The packet network 34 and TDM network 32 may be configured to interwork with one another outside of the enterprise communication environment 10.

As seen from the above, voice and data services are generally provided on different communication networks. When packetized voice or other real-time communications are provided by the local routing/switching system 18, switch 20, and network cabling 22, there is generally no ability to provide differentiated services or to control quality of service as necessary for real-time communications and voice, without significant upgrades to equipment or modernization of existing systems.

Figure 2:
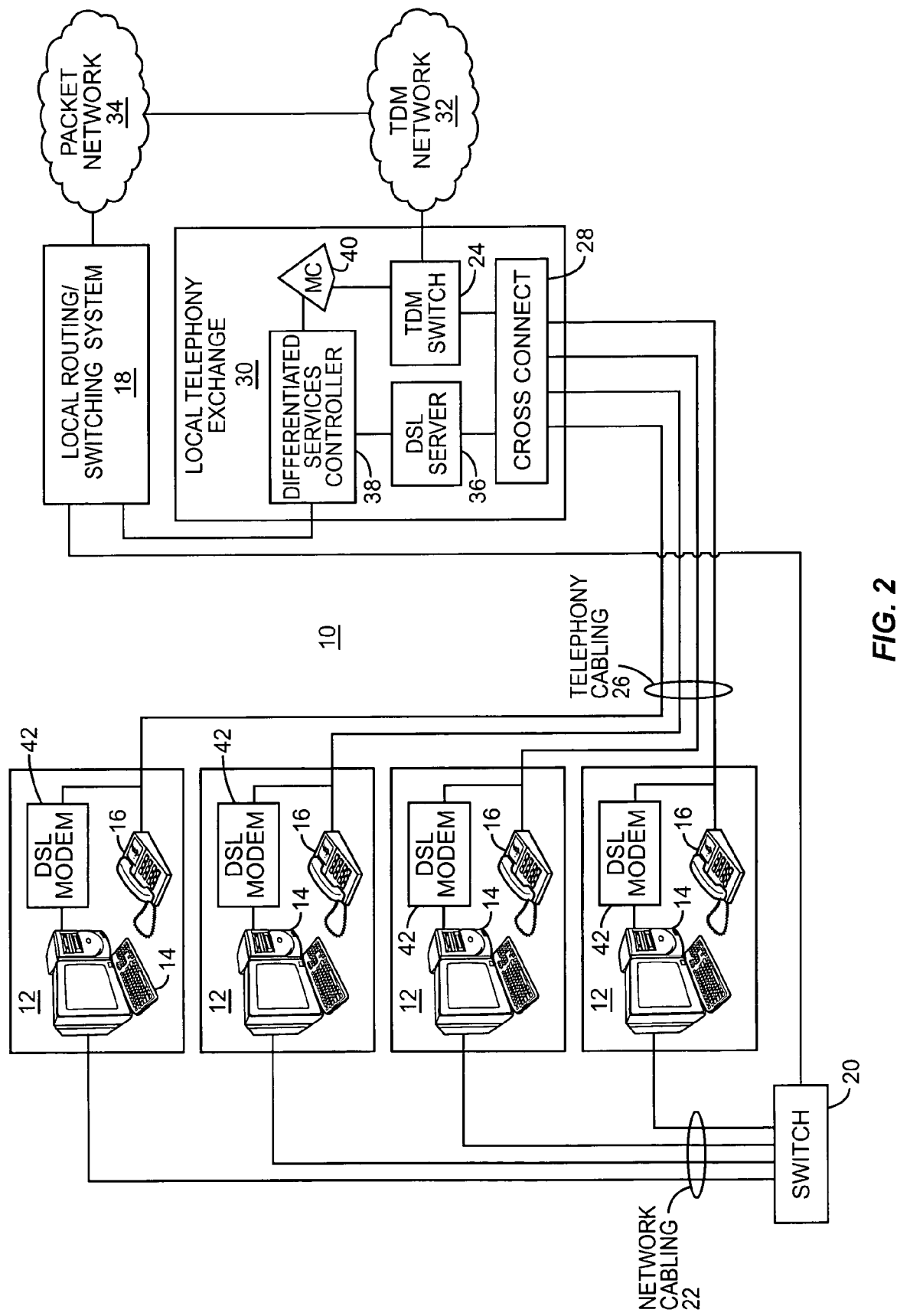
FIG. 2 is a block representation of a communication environment according to one embodiment of the present invention.

In an effort to provide a more efficient transition to converging voice and real-time communications in an efficient and effective manner, the present invention takes advantage of the telephony infrastructure to provide real-time communications, as well as data in select embodiments, in addition to traditional voice services. One embodiment of the present invention is illustrated in FIG. 2, wherein the local telephony exchange 30 is upgraded to provide real-time communications via a digital subscriber line (DSL) service over the telephony cabling 26. In particular, a DSL server 36, such as a Digital Subscriber Line Access Module (DSLAM), a differentiated services controller 38, such as a Differentiated Services Capable Switch/Router, and a media controller (MC) 40, such as a Multimedia Communications Server, may be provided in the local telephony exchange 30 and are associated with the TDM switch 24 and cross connect 28. The DSL server 36 may be coupled to the existing local routing/switching system 18 directly or indirectly via the differentiated services controller 38, wherein the differentiated services controller 38 and DSL server 36 will cooperate to provide DSL service to DSL modems 42 associated with the various user locations 12. The DSL modems 42 will connect to the computers 14 (or other network devices) via wireline or wireless interfaces such that packet-based communications can be provided to the computers 14 via the telephony cabling 26 using the DSL server 36 and the DSL modems 42.

Accordingly, any type of data, including real-time communications, may be provided to the computer 14 via the telephony cabling 26 and the DSL modem 42 using a DSL service controlled by the DSL server 36. As illustrated in FIG. 2, the local routing/switching system 18 may provide basic data services through the switch 20 and network cabling 22 to the computers 14. Voice and real-time communications are provided over the telephony cabling 26. In particular, traditional voice services to the telephony terminal 16 are supported via the TDM switch 24 over the telephony cabling 26 at frequencies below 4 KHz. The DSL service, which provides an alternate dedicated high capacity digital channel for real-time communications, is provided over the telephony cabling 26, for example at frequencies higher than 4 KHz, to each of the DSL modems 42, which will provide the necessary protocol conversion to cooperate with the computers 14.

Thus, real-time communications are supported via DSL service over the telephony cabling 26 from the packet network 34 to the computers 14, wherein traditional voice services are supported between the TDM network 32 and the telephony terminals 16 using the TDM switch 24. The cross connect 28 may couple to both the DSL server 36 and the TDM switch 24 to facilitate the respective connections over the telephony cabling 26 to the telephony terminals 16 and the DSL modems 42. To control any of the data services, including the real-time communications, via the telephony cabling 26, the differentiated services controller 38 will act to implement differentiated services, including quality of service controls. As such, data delivered to or from the computers 14 via the telephony cabling 26 and the DSL modems 42 are monitored and controlled by the differentiated services controller 38, which may prioritize various types of real-time communications with respect to one another as well as with respect to traditional data. For example, real-time communications, such as voice, audio, or video, may be prioritized in relation to other data being provided over telephony cabling 26 to ensure that traditional data does not interfere with the delivery of the voice, audio, or video packets. Similarly, voice or audio may be prioritized over video sessions. Further, different users may have various priorities with respect to one another. In terms of quality of service, certain types of communications or select users may require higher transfer rates or available bandwidth, and the differentiated services controller 38 will ensure that such control is provided.

A significant benefit in using DSL services for voice and real-time communications is the ability to support multimedia sessions wherein more than one communication session is established and associated with one another. For example, a video conference is a multimedia session requiring voice and video sessions, which are associated with one another. As such, the video session would be packetized video, wherein the delivery to and from the DSL modem 42 for the associated user location 12 is controlled by the differentiated services controller 38. The voice session may be provided by the TDM switch 24 in a circuit-switched fashion or via the DSL server 36 in a packet-based fashion. If the voice session is provided via the TDM switch 24, the media controller 40 will effectively cooperate with the differentiated services controller 38 or DSL server 36 and the TDM switch 24 to associate the media sessions in the local telephony exchange 30. The media controller 40 may also be used to establish one or more of the associated media sessions. For example, if a video conference is initiated, the media controller 40 may be used to establish the circuit-switched connection via the TDM switch 24, or vice versa. Further, if a file transfer session is also associated with the video conference, the media controller 40 may control the delivery and distribution of the file transfer data via the DSL server 36 or the differentiated services controller 38.

In a preferred embodiment, the DSL service is a very high speed DSL (VDSL) service, wherein the downlink can support data rates up to 50 Mbps and the uplink supports data rates up to 25 Mbps, depending on the loop length between the DSL server 36 and the DSL modem 42. With the present invention, convergence of various enterprise environments, such as those found in business, college, government, and hospital campuses, can be supported using existing telephony cabling 26 and the addition of relatively inexpensive equipment in the local telephony exchange 30, instead of requiring re-engineering and replacement of the local routing/switching system 18 to provide the required differentiated services to support real-time communications.

Figure 3A:
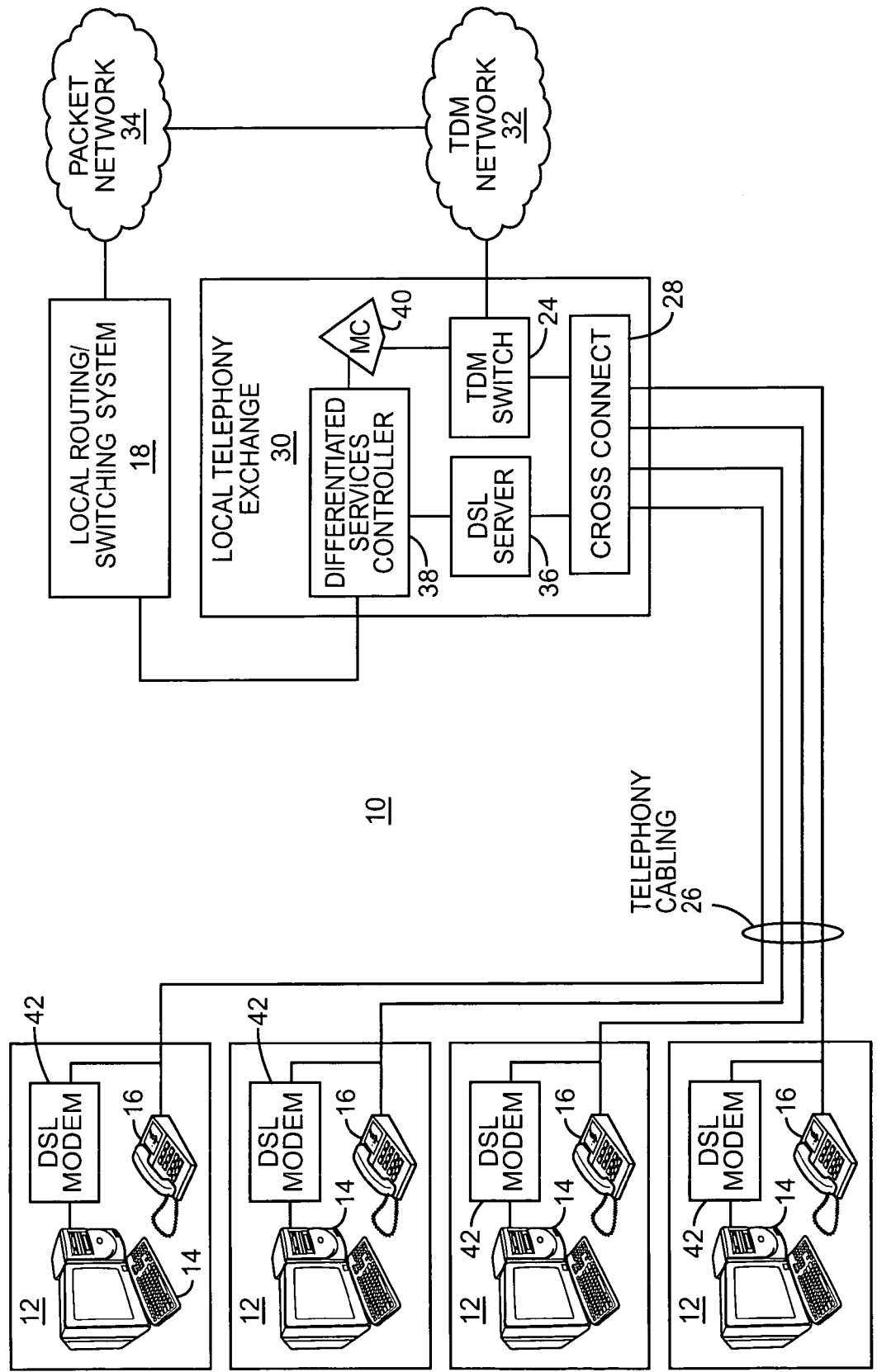
FIG. 3A is a block representation of a communication environment according to a second embodiment of the present invention.
Figure 3B:
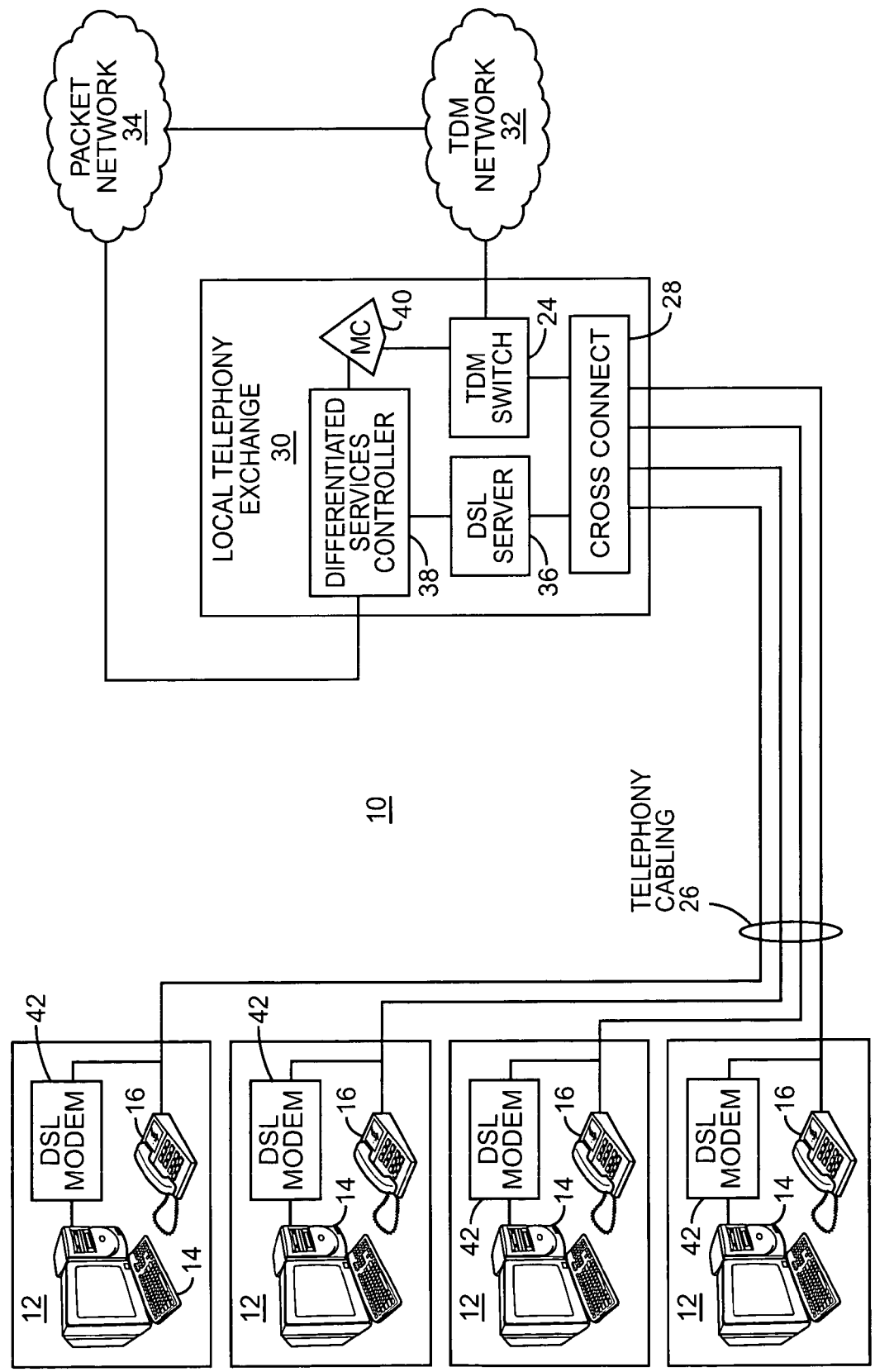
FIG. 3B is a block representation of a communication environment according to a third embodiment of the present invention.

As noted, basic data services may be provided through the existing network cabling 22 via the switch 20. However, the present invention may also be used to support traditional data services as well as voice and other real-time communications over the telephony cabling 26, as illustrated in FIG. 3A. In such an embodiment, the differentiated services controller 38 will be required to differentiate between the various types of real-time communications, if desired, and data services to ensure that the provision of the data services does not inappropriately affect the provision of the real-time communications. As illustrated in FIG. 3B, the differentiated services controller 38 may be directly coupled to the packet network 34 without dependence on the local routing/switching system 18. In any of the embodiments, voice services may be provided via the TDM switch 24 from the TDM network 32, via the packet network 34 through the local routing/switching system 18, or a combination thereof. When provided via the local routing/switching system 18, the voice will simply be another real-time communication session.

Figure 4A:
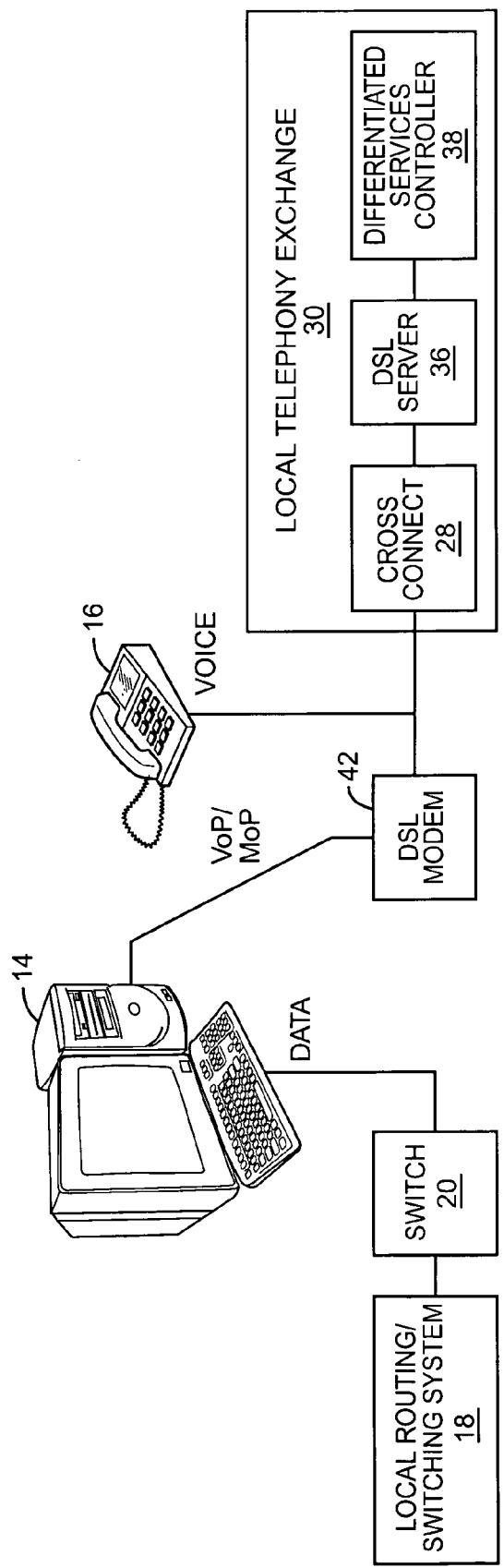
FIGS. 4A and 4B illustrate alternative embodiments for implementing certain aspects of the present invention.
Figure 4B:
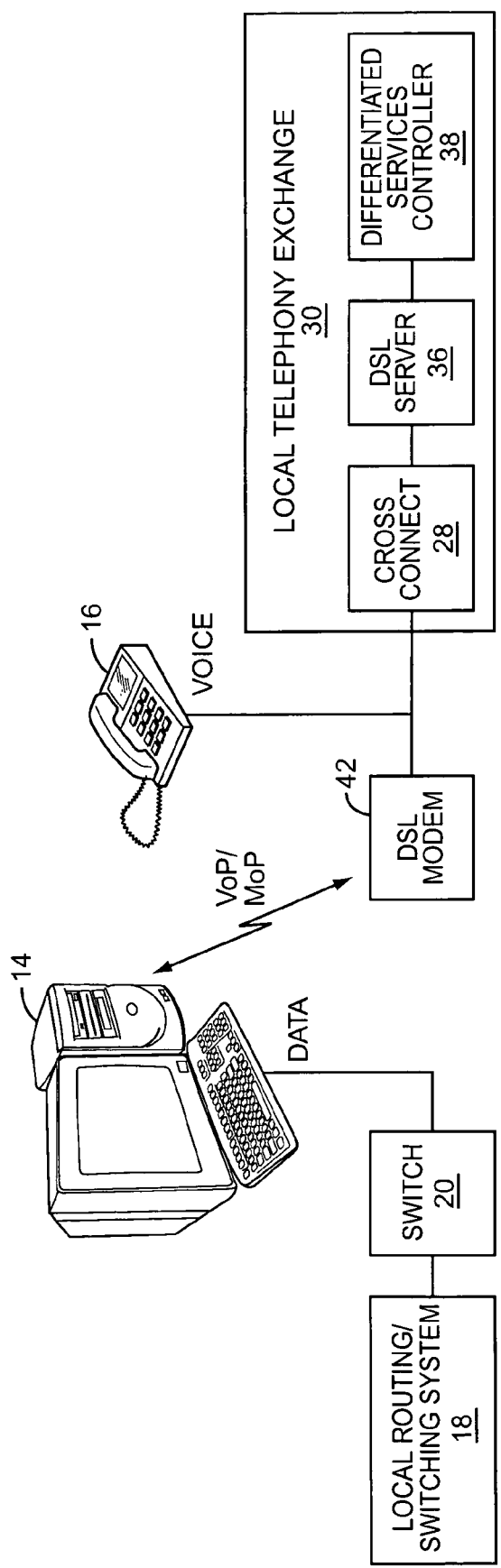

Turning now to FIGS. 4A and 4B, a basic overview of the communication environment described above is illustrated wherein communications between the DSL modem 42 and the computer 14 may be supported via a wired connection (FIG. 4A) or a wireless connection (FIG. 4B). In a wired embodiment, communications between the DSL modem 42 and the computer 14 may be supported via Ethernet, Universal Serial Bus (USB), or like connection. A wireless interface may be facilitated using any wireless local area network technology, such as the IEEE's 802.11 standards, Bluetooth, infrared, or like wireless interface standard. Regardless of the interface technology, real-time communications may be facilitated using Voice over Packet (VoP) or Media over Packet (MoP) protocols.

Figure 5:
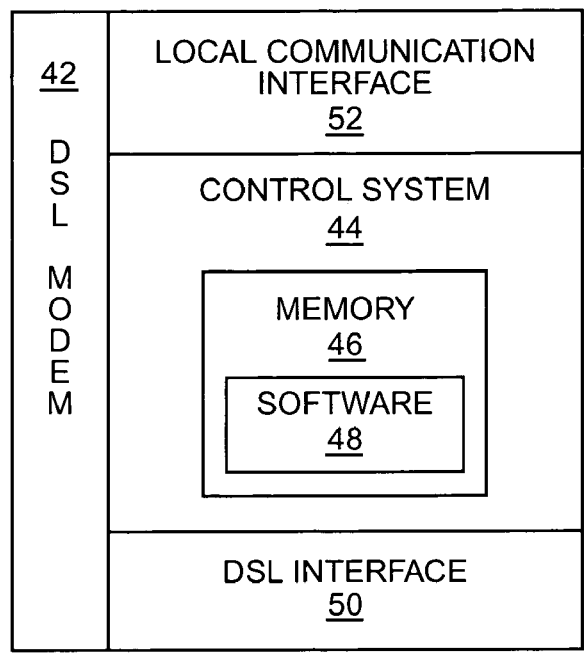
FIG. 5 is a block representation of a DSL modem according to one embodiment of the present invention.

With reference to FIG. 5, a block representation of a DSL modem 42 is illustrated according to one embodiment of the present invention. The DSL modem 42 may include a control system 44 with memory 46 sufficient for software 48 facilitating operation as described above. The control system 44 will control a DSL interface 50, which will connect to the telephony cabling 26 and be able to support DSL services over the telephony cabling 26 via the cross connect 28 with the DSL server 36. The control system 44 will also control a local communication interface 52, which is capable of providing communications with the computer 14. As noted, the local communication interface 52, depending on implementation and configuration, may support wired or wireless communications with the computer 14. The control system 44 will operate to facilitate interworking between the DSL services via the DSL interface 50 and the appropriate communication standards supported by the local communication interface 52.

Figure 6:
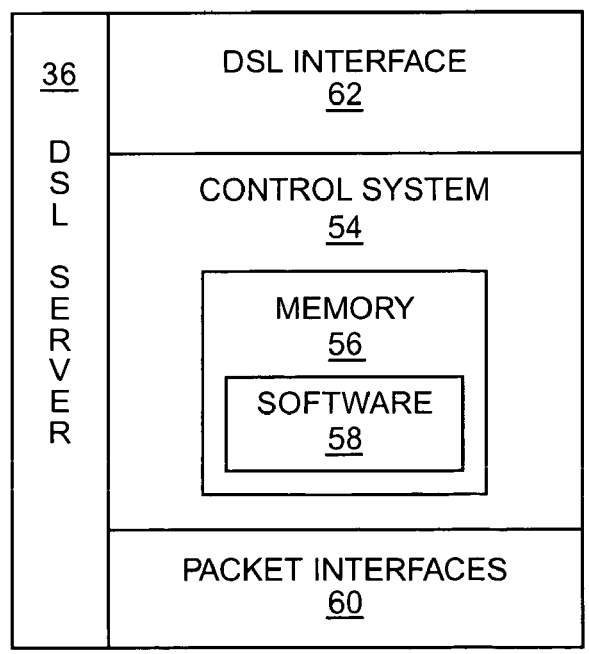
FIG. 6 is a block representation of a DSL server according to one embodiment of the present invention.

With reference to FIG. 6, a DSL server 36 is illustrated according to one embodiment of the present invention. The DSL server 36 will include a control system 54 having memory 56 sufficient for software 58 supporting operation as described above. The control system 54 will include one or more packet interfaces 60, which will cooperate or connect with the differentiated services controller 38, the local routing/switching system 18, or both, to facilitate packet-based communications over the packet network 34. The control system 54 will also include a DSL interface 62, which will provide DSL services over the telephony cabling 26, directly or via the cross connect 28. In essence, the DSL interface 62 will implement a DSL modem complementing that provided by the DSL interface of the DSL modem 42.

Those skilled in the art will recognize improvements and modifications to the preferred embodiments of the present invention. All such improvements and modifications are considered within the scope of the concepts disclosed herein and the claims that follow.

What is claimed is:

1. A telephony exchange for providing voice and real-time communications to a plurality of user locations over telephony cabling, each location including a telephony terminal and a digital subscriber line (DSL) modem coupled to the telephony cabling, the telephony exchange comprising:
   a) a telephony switch operatively coupled to a circuit-switched telephony network and the telephony cabling and adapted to provide voice communications with the telephony terminal at each user location over the telephony cabling; and
   b) a DSL server operatively coupled to a packet network and the telephony cabling and adapted to provide real-time communications using a DSL service with the DSL modem at each user location over the telephony cabling, wherein the DSL modem is operatively coupled to a device supporting the real-time communications at the user location.

2. The telephony exchange of claim 1 further comprising a differentiated services controller operatively associated with the DSL server and adapted to provide differentiated services control for the real-time communications provided to the DSL modems at the user locations.

3. The telephony exchange of claim 2 wherein the differentiated services controller is further adapted to provide quality of service control for the real-time communications.

4. The telephony exchange of claim 2 further comprising a media controller operatively coupled to the differentiated services controller and the telephony switch and adapted to control multimedia sessions comprising a voice session and a real-time communication session.

5. The telephony exchange of claim 2 wherein the differentiated services controller is coupled between the packet network and the DSL server.

6. The telephony exchange of claim 5 wherein the differentiated services controller is coupled to a local routing or switching system, which is connected to the packet network.

7. The telephony exchange of claim 1 further comprising a cross connect to which the DSL server, telephony switch, and telephony cabling are connected, wherein a separate telephony cable of the telephony cabling connects each user location to the cross connect.

8. The telephony exchange of claim 1 wherein data services are provided to each device via network cabling operatively coupled to the packet network via a local routing or switching system.

9. The telephony exchange of claim 1 wherein the DSL server is further adapted to provide data services to the device at each user location via the telephony cabling and the DSL modem.

10. The telephony exchange of claim 1 wherein the telephony switch is a private branch exchange telephony switch.

11. A method for providing voice and real-time communications to a plurality of user locations over telephony cabling, each location including a telephony terminal and a digital subscriber line (DSL) modem coupled to the telephony cabling, the method comprising:

a) providing voice communications with the telephony terminal at each user location over the telephony cabling via a telephony switch operatively coupled to a circuit-switched telephony network and the telephony cabling; and b) providing real-time communications using a DSL service with the DSL modem at each user location over the telephony cabling via a DSL server operatively coupled to a packet network and the telephony cabling, wherein the DSL modem is operatively coupled to a device supporting the real-time communications at the user location.

12. The method of claim 11 further comprising providing differentiated services control for the real-time communications provided to the DSL modems at the user locations.

13. The method of claim 12 further comprising providing quality of service control for the real-time communications.

14. The method of claim 12 further comprising controlling multimedia sessions comprising a voice session and a real-time communication session.

15. The method of claim 11 wherein a cross connect couples the DSL server, telephony switch, and telephony cabling, wherein a separate telephony cable of the telephony cabling connects each user location to the cross connect.

16. The method of claim 11 further comprising providing data services to each device via network cabling operatively coupled to the packet network via a local routing or switching system.

17. The method of claim 11 further comprising providing data services to the device at each user location via the telephony cabling and the DSL modem using the DSL server.

18. The method of claim 11 wherein the telephony switch is a private branch exchange telephony switch.

19. A system for providing voice and real-time communications to a plurality of user locations over telephony cabling, each location including a telephony terminal and a digital subscriber line (DSL) modem coupled to the telephony cabling, the telephony exchange comprising:

a) means for providing voice communications with the telephony terminal at each user location over the telephony cabling via a telephony network; and b) means for providing real-time communications using a DSL service with the DSL modem at each user location over the telephony cabling via a packet network, wherein the DSL modem is operatively coupled to a device supporting the real-time communications at the user location.

20. The system of claim 19 further comprising means for providing differentiated services control for the real-time communications provided to the DSL modems at the user locations.

21. The system of claim 20 wherein the means for providing differentiated services control further comprises means for providing quality of service control for the real-time communications.

22. The system of claim 19 further comprising means for controlling multimedia sessions comprising a voice session and a real-time communication session.

23. The system of claim 19 further comprising means for providing data services to each device via network cabling operatively coupled to the packet network via a local routing or switching system.

24. The system of claim 19 further comprising means for providing data services to the device at each user location via the telephony cabling and the DSL modem.

25. The system of claim 19 wherein the telephony switch is a private branch exchange telephony switch.

* * * * *

UNITED STATES PATENT AND TRADEMARK OFFICE
CERTIFICATE OF CORRECTION

| | |
|---|---|
| PATENT NO. | : 7,324,506 B1 |
| APPLICATION NO. | : 10/705274 |
| DATED | : January 29, 2008 |
| INVENTOR(S) | : Stephen Bennett Elliott et al. |

Page 1 of 1

It is certified that error appears in the above-identified patent and that said Letters Patent is hereby corrected as shown below:

Title page,
Item [73], Assignee, please add as follows: -- Assignee: Nortel Networks Limited, St. Laurent (CA) --

Signed and Sealed this

Twenty-third Day of September, 2008

JON W. DUDAS
*Director of the United States Patent and Trademark Office*